Aug. 11, 1970  C. J. BARECKI ET AL  3,523,710
SAFETY VEHICLE SEAT
Filed July 11, 1968
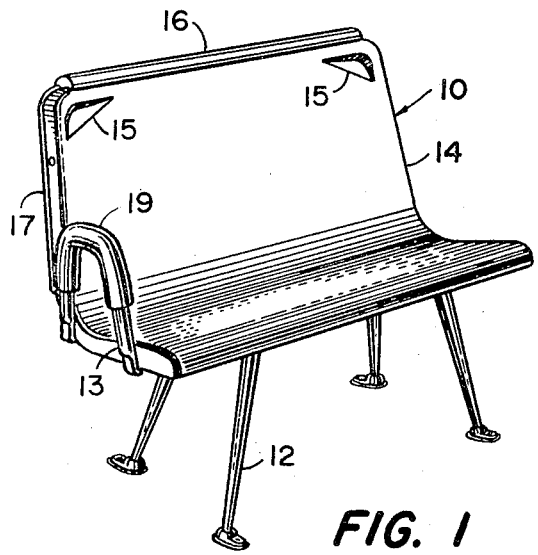
FIG. 1
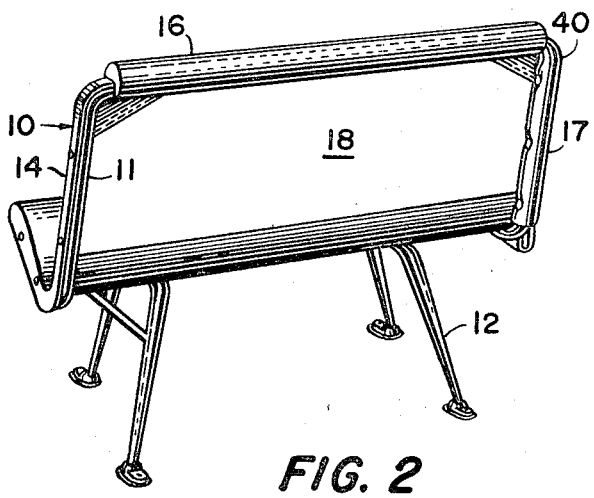
FIG. 2
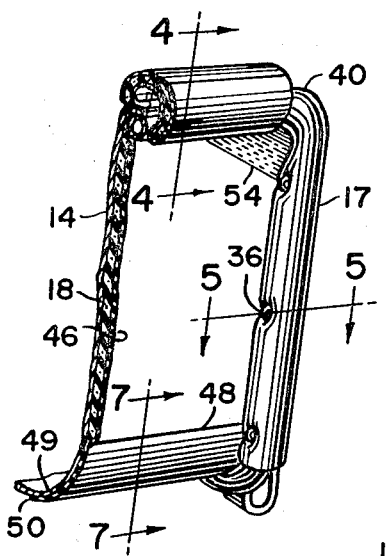
FIG. 3
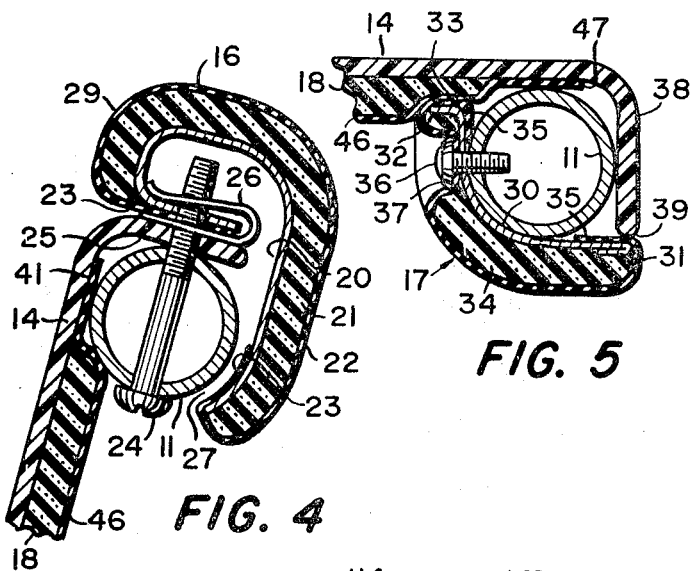
FIG. 4
FIG. 5
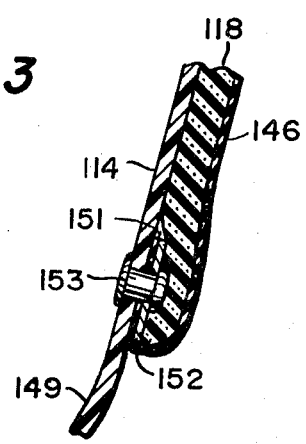
FIG. 7
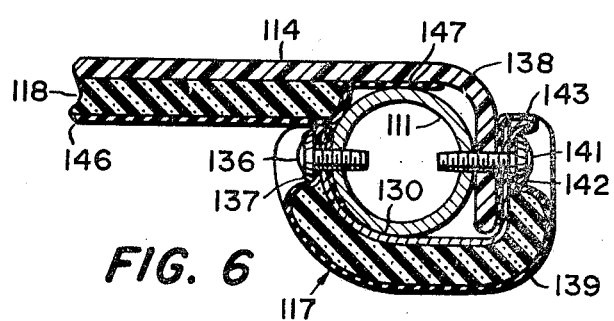
FIG. 6
INVENTORS
Chester J. Barecki
Arthur J. Hogan, Jr.
BY Dawson, Tilton, Fallon,
and Lungmus
ATTORNEYS

United States Patent Office 3,523,710
Patented Aug. 11, 1970

3,523,710
SAFETY VEHICLE SEAT
Chester J. Barecki, and Arthur J. Hogan, Jr., Grand Rapids, Mich., assignors to American Seating Company, Grand Rapids, Mich., a corporation of Delaware
Filed July 11, 1968, Ser. No. 743,995
Int. Cl. A47c 27/14, 27/22
U.S. Cl. 297—456      6 Claims

ABSTRACT OF THE DISCLOSURE

A vehicle seat such as a bus seat, etc., is provided with energy-absorbing deformable metal panels anchored to the seat frame rails and enclosed in resilient cushioning material, and such panels extend over the back frame top rail and side rails. Cushioning material also is anchored to the back of the seat and the arm rest. The structure protects an occupant of a rear seat against metal frame members, seat back edges, and metal panel edges.

BACKGROUND AND SUMMARY

Mere padding of a seat is not protective of the occupant of a rear seat in a bus or other vehicle in the case of an accident or sudden deceleration of the vehicle because impact with the heavy metal frame can be very severe. To provide the protection needed, we have discovered that a deformable metal panel is essential so as to absorb the heavy flow while yielding under the blow, and in combination with the panel, resilient cushioning material is needed to prevent contusions, abrasions, and surface injuries. Even when a deformable metal panel is provided for the above purpose, a problem is presented by the panel itself in presenting exposed metal edges, etc. and exposed fastenings which anchor the panel to the back frame.

We have discovered that the deformable energy-absorbing panels can be firmly anchored to the back frame in such a manner that they are effective in yielding to absorb energy of impact, while at the same time presenting no additional hazards and while providing resilient protective material in anchored relation about the panels.

DRAWING

In the accompanying drawing, FIG. 1 is a front perspective view of the vehicle seat; FIG. 2, a rear perspective view; FIG. 3, a fragmentary perspective view of the rear side of the back panel of the bus seat on the aisle side; FIG. 4, a vertical sectional view, the section being taken as indicated at line 4—4 of FIG. 3; FIG. 5, a broken vertical sectional view, the section being taken as indicated at line 5—5 of FIG. 3; FIG. 6, a view similar to FIG. 5 but showing a modified form of construction; and FIG. 7, a fragmentary vertical section, the section being taken as indicated at line 7—7 of FIG. 3.

DETAILED DESCRIPTION

In the illustration given, a bus seat 10 is shown provided with a tubular frame 11 having a vertical side rail and a horizontal top rail, the frame being mounted on tapered tubular legs 12. Mounted on the frame is a tubular arm rest 13. The seat frame is covered with a one-piece seat and back back panel 14 which may be formed of glass fibers or other suitable material, and the back panel 14 has hand grips 15 formed in the seat back near the corners of the back. The seat back is provided at the top rails with a crash pad 16. Similarly, the side rail of the frame is provided with a crash pad 17 on the aisle side, and the seat back 14 is provided on its back side with a resilient panel 18. A resilient energy-absorbing sleeve 19 is provided also for the arm rest 13.

As shown best in FIG. 4, the top rail of the seat frame 11 is provided with a crash pad 16 which consists of an energy-deflecting deformable panel or shell 20, preferably formed of metal and covered with an energy-absorbing foam pad 21 which is cemented to it, the pad being covered with a vinyl upholstering material 22 cemented to the back side 23 of the steel panel 20. A long screw 24 passes up through the frame tube 11, the flange of the glass fiber back 25, the upper end of the steel shell 20, and into a spring clip 26. There is to be a space 27 between the energy-deflecting material 20 and the frame tube 11 to allow room for the pad 16 to deflect upon having a sudden contact with a passenger. The steel is thin enough to be able to deflect elsewhere, upon sudden impact, such as at 28 and 29.

Referring to FIG. 5, the crash pad or pad assembly 17 consists of a long curved steel piece 30 hemmed to remove a sharp cutting edge 31 and bent at 90° at the back pad, as indicated by the numeral 32, to help hold the pad in place at 33. There is a piece of energy-absorbing foam pad 34 cemented to it and is covered with vinyl upholstering material cemented to the back side of the steel panel 35. This pad assembly is attached to the frame tube 11 by several thread-cutting screws 36. Washers 37 are used to prevent the upholstering material from winding around the screw and to prevent the screw from pulling through the upholstering material and foam pad. The pad assembly is designed so as to prevent the occupants from striking the tubular frame 11 or the rather sharp hard edge 39 of the end 38 of the back panel 14 from the rear. This pad covers the entire length of the side frame, rounds the upper corner 40, and fits against the end of the top rail pad.

As shown in FIG. 5, the rear foam pad 18 is cemented to the rear side of the glass fiber back panel 14 and is covered with a piece of vinyl upholstery material 46 which is cut large enough to fit between the frame tube 11 and the glass fiber back panel 14 and is cemented to the glass fiber panel 47. The foam pad 18 ends at 48 where the back at 49 begins to curve into the seat portion, but the upholstery panel 46 continues around the curve 49. The shaded areas 54 in the upper corners of the back pad are actually the back side of the hand grips 15.

Referring to the modification in FIG. 6, the protective pad 117 covers the end flange 138 of the glass fiber panel 114 as well as the rear edge 139 and is attached to the frame tube 111 on both sides with screws 136 and 141 and washers 137 and 142, preventing the pad assembly from being pulled away from the edge of the glass fiber and giving added protection to the occupants.

FIG. 7 shows a variation in the ending of the foam pad 118 and the upholstery material 146 at the curve in the back 149. The lower end 151 of the upholstery material is held against the back panel 114 by means of a steel border plate 152 which is attached to the glass fiber panel by several "pop" rivets 153 inserted from the front side. This fastening is done first, then the foam pad 118 is cemented to the glass fiber, and the upholstery material is smoothed out and also cemented to the glass fiber. Then the panel 114 is attached to the tubular frame 11.

The inverted U-shaped arm rest 13 is covered by an energy-absorbing foam hose-like piece of material that is molded to fit the curve of the steel tube without forming any unsightly bulges and creases.

While in the foregoing specification we have set out specific structure in considerable detail for the purpose of illustrating the invention, it will be understood that such details may be varied widely by those skilled in the art without departing from the spirit of our invention.

We claim:

1. In a vehicle seat having a rigid rail frame for supporting the seat back and a seat back carried by said frame, a deformable energy-absorbing metal panel secured at one end over the top rail of said frame and having a free deflecting side extending downwardly below said rail along one side thereof, anchoring means extending through said frame top rail and said metal panel and in a direction generally parallel with said downwardly-extending portion of said panel, and resilient cushioning means covering the outer portion of said panel.

2. The structure of claim 1 in which said metal panel is bent back upon itself to receive the top of said resilient cushioning material.

3. The structure of claim 2 in which said anchoring means draws said bent portion of the panel into clamping relation to said cushioning material.

4. The structure of claim 1 in which said deformable metal panel extends below said top rail of the seat frame in spaced relation thereto.

5. In a vehicle seat having a rigid back frame having side rails and a seat back carried by said frame, a deformable energy-absorbing metal panel having one edge portion anchored to said side rail and having a free edge portion extending rearwardly of said rail, fastening means extending through said side rail and said deformable metal panel in a direction generally parallel with said rearwardly-extending portion of said panel, and resilient cushioning material over the rear side of said deformable panel.

6. The structure of claim 5 in which said deformable metal panel has edge portions on opposite sides of said side rail and fastening means on opposite sides of said rail for securing said edges to said rail.

References Cited

UNITED STATES PATENTS

| | | | |
|---|---|---|---|
| 2,495,654 | 1/1950 | Ford | 297—232 |
| 3,243,234 | 3/1966 | Fehlner | 297—457 |
| 3,323,835 | 6/1967 | Barecki | 297—445 |
| 3,393,933 | 7/1968 | Cornelius | 248—345.1 |

CASMIR A. NUNBERG, Primary Examiner

U.S. Cl. X.R.

297—445, 457